United States Patent [19]

Ichikawa et al.

[11] 4,455,097

[45] Jun. 19, 1984

[54] SPECTROPHOTOMETER

[75] Inventors: Tetsuo Ichikawa, Kusatsu; Osamu Akiyama, Kyoto; Rikuo Hira, Kyoto; Takashi Nishimura, Kyoto, all of Japan

[73] Assignee: Shimadzu Corporation, Kyoto, Japan

[21] Appl. No.: 362,887

[22] Filed: Mar. 29, 1982

[30] Foreign Application Priority Data

Jun. 29, 1981 [JP] Japan ............................ 56-97543[U]

[51] Int. Cl.³ ............................................. G01J 3/42
[52] U.S. Cl. ...................................... 356/323; 356/325
[58] Field of Search ................. 356/319, 320, 323–325

[56] References Cited

U.S. PATENT DOCUMENTS 3,606,547 9/1971 Iwahashi ............................ 356/325
3,927,944 12/1975 Iwahashi et al. ..................... 356/320

Primary Examiner—F. L. Evans
Attorney, Agent, or Firm—Fidelman, Wolffe and Waldron

[57] ABSTRACT

A spectrophotometer which can be used selectively as a single-beam and a double-beam type and comprises a light source, a monochromator, a chopper mirror for causing the monochromatic light beam from the monochromator to alternately advance along a first and a second path, in which a reference and a sample cell are disposed respectively, a beam combiner for causing the alternate beams to advance along a common path leading to a photoelectric detector, and a mirror movable for selective positioning in and out of the monochromatic light beam between the monochromator and the chopper mirror.

9 Claims, 3 Drawing Figures

SPECTROPHOTOMETER

BACKGROUND OF THE INVENTION

This invention relates to a spectrophotometer which can be used selectively as a single-beam and a double-beam spectrophotometer.

In a typical double-beam spectrophotometer, the monochromatic light beam emerging from a monochromator is divided into two beams commonly referred to as the reference and sample beams by use of a rotating chopper mirror.

Since the two beams are chopped, it is impossible to measure a sample which changes more rapidly than the chopping cycle. For example, if the chopping cycle is 60 Hz, it is impossible to measure a sample which changes materially within a period of about 17 milliseconds.

Therefore, for measurement of such rapidly changing samples a single-beam spectrophotometer without any rotating component such as a chopper is used. However, to have two types of spectrophotometers ready for use at hand requires a high cost for installation and maintenance, and it is troublesome to selectively use two types of instruments.

SUMMARY OF THE INVENTION

Accordingly, the primary object of the invention is to provide a spectrophotometer which can selectively be used as a double-beam and a single-beam type.

Briefly stated, the spectrophotometer of the invention comprises means for producing a beam of monochromatic light; beam splitting means for causing the monochromatic light beam to alternately advance along a first and a second optical path; cell means disposed in each of the first and second optical paths; photoelectric means for receiving light from each of the cell means to produce a corresponding electrical signal; and optical reflecting means movable for selective positioning in and out of the monochromatic light beam so that when the movable optical reflecting means is positioned in the monochromatic light beam, it causes the light beam to advance along only one of the first and second optical paths.

DETAILED DESCRIPTION OF THE ILLUSTRATED EMBODIMENTS

Figure 1:
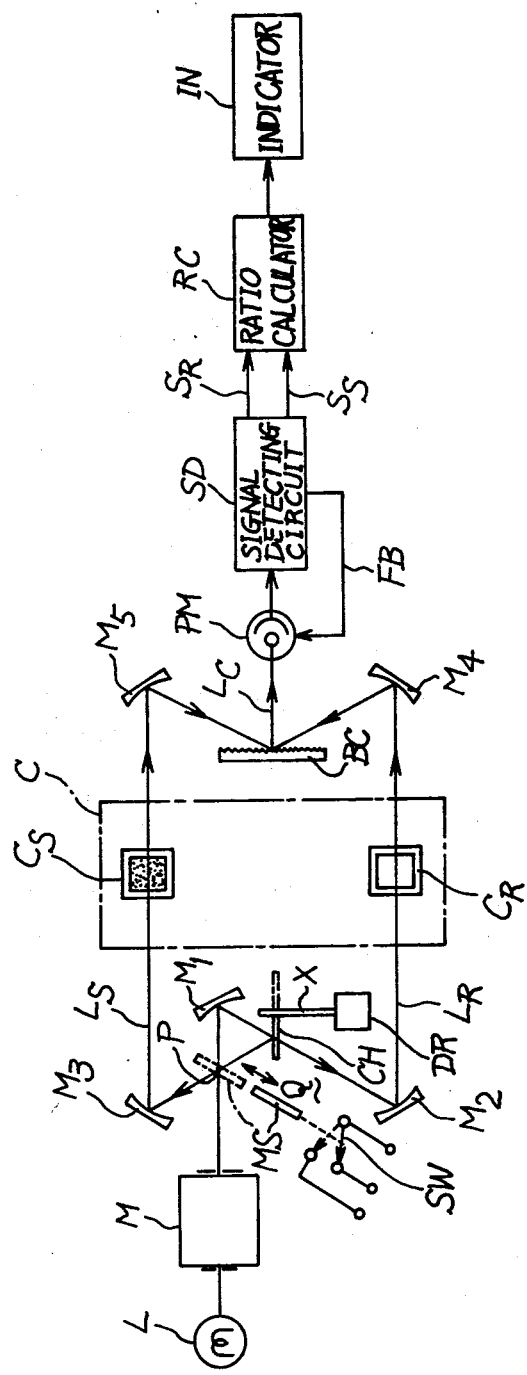
FIG. 1 schematically shows one embodiment of the invention.

Referring to FIG. 1, there is shown a light source L which produces a light over a range of wavelengths. A monochromator M receives the light from the lamp L and produces a monochromatic light of a selected wavelength. The monochromatic light is reflected by a mirror $M_1$ toward a chopper CH rotatable about an axis X by a suitable drive DR.

As the chopper CH is rotated, it causes the monochromatic light from the monochromator M to advance alternately along a first and a second optical path. The first optical path and the light beam thereon will be referred to as the reference optical path and the reference beam, respectively, and both the path and the beam will be commonly designated by $L_R$. The second optical path and the beam thereon will be referred to as the sample optical path and the sample beam, respectively, and both the path and the beam will be commonly designated by $L_S$.

The reference beam $L_R$ passing the chopper CH is reflected by a mirror $M_2$ to pass through a reference cell $C_R$ placed in a cell room C so as to be reflected by a mirror $M_4$ onto a beam combiner BC.

The sample beam $L_S$ reflected by the chopper CH intersects the monochromatic light beam between the monochromator M and the first mirror $M_1$ at a point P and is reflected by a mirror $M_3$ to pass through a sample cell $C_S$ placed in the cell room C so as to be reflected by a mirror $M_5$ onto the beam combiner BC.

The beam combiner BC causes the sample and reference beams $L_S$ and $L_R$ to alternately advance on a common optical path $L_C$ onto a detector such as a photomultiplier tube PM. In the illustrated embodiment, the beam combiner BC is a mirror the reflective surface of which is formed into a plurality of parallel ridges each having a triangular or roof-shaped configuration in transverse section. In other words, the reflective surface of the beam combiner BC as a whole has a saw tooth configuration in transverse section.

Instead of the mirror, a light diffusing plate may be used as the beam combiner.

If the mirrors $M_4$ and $M_5$ are so arranged as to cause the sample and reference beams $L_S$ and $L_R$ to intersect at approximately 90° at a point where the photosensitive surface of the photomultiplier tube PM is positioned, the beam combiner may be omitted.

Characteristic of the invention is the provision of a mirror shutter MS at the previously mentioned point P where the sample beam $L_S$ reflected by the chopper CH intersects the monochromatic light beam immediately after it emerged from the monochromator M. The mirror shutter MS is mounted for selective movement between two positions illustrated in solid and dot-and-dash lines, respectively, which will be referred to as positions P and Q, respectively. For moving the mirror shutter MS any suitable mechanism not shown may be employed. It may also be moved manually.

While the shutter MS is in position Q completely out of the optical path, the monochromatic light from the monochromator M is reflected by the mirror $M_1$ and caused by the chopper CH to alternately advance along the reference and sample paths, so that the instrument functions as a double-beam spectrophotometer.

When the mirror shutter MS has been moved from position Q into position P, that is, in the optical path of the monochromatic light before the mirror $M_1$, the mirror shutter MS completely prevents the light from advancing to the mirror $M_1$ but reflects the light onto the mirror $M_3$, so that the instrument functions as a single-beam spectrophotometer, with the single optical path coinciding with the sample beam path $L_S$ when the instrument functions as a double-beam type.

Adjacent the mirror shutter MS there is provided a triple-pole switch SW operable in ganged relation to the above-mentioned selective positioning of the mirror shutter. The switch SW functions to adapt a signal detecting circuit SD of the instrument to either single-beam or double-beam spectrophotometric measurement as will be described below with reference to FIG. 2.

Figure 2:
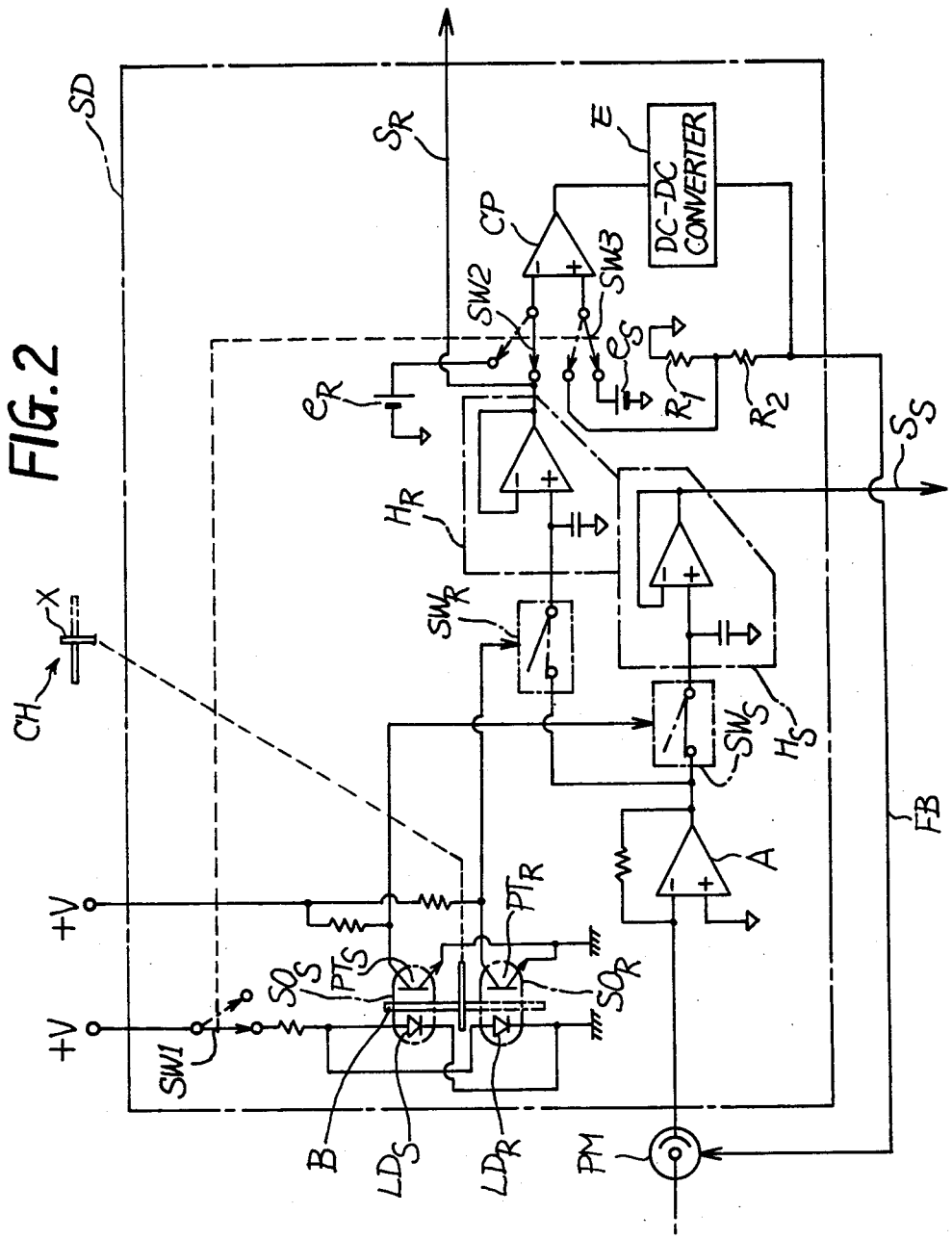
FIG. 2 is a block diagram of the signal detecting circuit of the system of FIG. 1.

The switch SW in FIG. 1 is shown in FIG. 2 as three separate switches $SW_1$, $SW_2$ and $SW_3$ which are ganged for simultaneous switching operation.

In FIG. 2, when the switches $SW_1$, $SW_2$ and $SW_3$ are in the dot-and-dash line position, with the mirror shutter MS being in position P in FIG. 1, the circuit SD is in the single-beam measurement mode, with a switch $SW_S$ being continuously closed as will be described presently.

When the mirror shutter MS is retracted to the solid line position Q thereby to bring the switches $SW_1$ to $SW_3$ to the solid line position, the circuit is in the double-beam measurement mode, with the switches $SW_S$ and $SW_R$ being alternately opened and closed as will be described below.

A pair of switch operators $SO_S$ and $SO_R$ each comprise a light emitting diode $LD_S$, $LD_R$ and a phototransistor $PT_S$, $PT_R$ facing the diode, with a rotatable chopping blade B being interposed between the diodes $LD_S$, $LD_R$ and the phototransistors $PT_S$, $PT_R$ for chopping the light beam from the former to the latter element. The blade B is rotated in synchronism with the chopper CH in FIG. 1 so that the switch operators $SO_S$ and $SO_R$ alternately produce a series of pulses in synchronism with the rotation of the chopper CH in FIG. 1.

The pulses from the switch operator $SO_S$ are used to open and close the switch $SW_S$ while the pulses from the switch operator $SO_R$ are used to close and open the switch $SW_R$ alternately with the switch $SW_S$. In other words, when the switch $SW_S$ is opened, the switch $SW_R$ is closed and when the switch $SW_R$ is closed, the switch $SW_S$ is opened.

In particular, when the rotating chopper CH in FIG. 1 is in the solid line position reflecting the monochromatic light from the mirror $M_1$ to advance along the sample beam path $L_S$, with the shutter MS having been retracted to the solid line position Q, the chopping blade B in FIG. 2 is in the solid line position intercepting the light from the diode $LD_S$ to the phototransistor $PT_S$ in the switch operator $SO_S$ while passing the light from the diode $LD_R$ to the phototransistor $PT_R$ in the switch operator $SO_R$, so that the output level of the phototransistor $PT_S$ becomes high thereby to close the switch $SW_S$ while the output level of the transistor $PT_R$ is low thereby to open the switch $SW_R$. Under the condition, the output from the photomultiplier tube PM caused by the sample beam $L_S$ passes through a preamplifier A and the closed switch $SW_S$ to be held in a holding circuit $H_S$, the output $S_S$ of which contains information about the sample being measured and will be referred to as the sample signal.

When the chopper CH is rotated to the dot-and-dash line position in FIG. 1 passing the light from the mirror $M_1$ to advance along the reference optical path $L_R$, the chopping blade B in FIG. 2 is rotated to the dot-and-dash line position intercepting the light from the diode $LD_R$ to the phototransistor $PT_R$ while passing the light from the diode $LD_S$ to the phototransistor $PT_S$, so that the switch $SW_R$ is closed and the switch $SW_S$ is opened as will be easily seen from the foregoing description. Under the condition the output from the photomultiplier tube PM caused by the reference beam $L_R$ passes through the preamplifier A and the closed switch $SW_R$ to be held in a holding circuit $H_R$, the output of which will be referred to as the reference signal $S_R$.

Under the present condition, since the switches $SW_1$, $SW_2$ and $SW_3$ are in the solid line position as previously mentioned, the output $S_R$ of the holding circuit $H_R$ is applied to the negative input terminal of a comparator CP, to the positive input terminal of which a reference voltage $e_S$ is applied.

The output of the comparator CP is applied to a DC—DC converter E, the output of which is kept constant and applied to the dynode of the photomultiplier tube PM to form a dynode feedback loop FB thereby to keep the sensitivity of the tube constant.

When the mirror shutter MS is moved into position P in FIG. 1 thereby to put the instrument into the single-beam measurement mode, the switches $SW_1$ to $SW_3$ are moved into the dot-and-dash line position in FIG. 2. With the switch $SW_1$ having been opened, the diodes $LD_R$ and $LD_S$ do not emit light, so that the phototransistors $PT_R$ and $PT_S$ produce an output, which keeps the switches $SW_S$ and $SW_R$ continuously closed. The condition of the switch $SW_R$ does not matter in the single-beam measurement mode of the instrument since it is the sample beam $L_S$ alone that is produced in this mode.

The output of the photomultiplier tube PM caused by the sample beam $L_S$ is amplified by the preamplifier A and passed through the closed switch $SW_S$ to be held by the holding circuit $H_S$, the output of which is the sample signal $S_S$.

On the other hand, the output of the DC—DC converter E is divided by a series of resistors $R_1$ and $R_2$ and the divided voltage is applied through the switch $SW_3$ to the positive input terminal of the comparator CP, to the negative input terminal of which a constant voltage $e_R$ is applied as a reference voltage. The output of the comparator CP is applied to the converter E so as to keep the output voltage of the converter E constant, and this constant voltage is fed back to the dynode of the photomultiplier tube PM to keep its sensitivity constant.

The signals $S_S$ and $S_R$ are applied to a ratio calculator RC, which produces a signal corresponding to the concentration of the sample to be indicated by an indicator IN.

If the mirror shutter MS is held in position P for the single-beam mode and the sample cell $C_S$ is replaced by a mirror arranged aslant to the sample beam, the instrument shown in FIG. 1 can be used as a monochromator.

Figure 3:
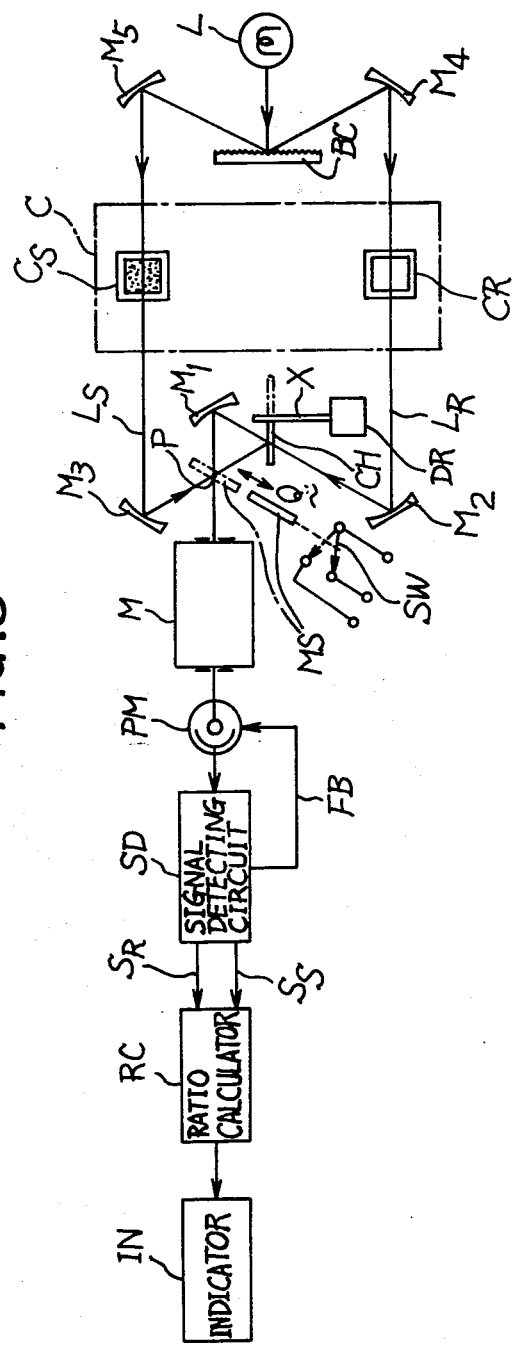
FIG. 3 is a view similar to FIG. 1 but showing another embodiment of the invention.

In the system of FIG. 1 the position of the lamp L and that of the photomultiplier tube PM may be exchanged as shown in FIG. 3 to obtain the same result. In this case, the beam combiner BC functions as a beam splitter and the chopper CH functions as a beam combiner.

Thus, in accordance with the invention by merely positioning a single mirror in or out of a single optical path in a spectrophotometer it is possible to use the instrument for single-beam or double-beam measurement. This not only eliminates inconvenience in changing the type of spectrophotometer in accordance with the kind of sample to be measured, but also contributes greatly to economy since a single instrument suffices for various kinds of measurement.

What we claim is:

1. A spectrophotometer comprising: means for producing a beam of monochromatic light; beam splitting means for causing said monochromatic light beam to alternately advance along a first and a second optical path; cell means disposed in each of said first and second optical paths; photoelectric means for receiving the light from each of said cell means to produce a corresponding electrical signal; and optical reflecting means movable for selective positioning in and out of said monochromatic light beam between said means for producing a beam of monochromatic light and said beam splitting means so that when said movable optical reflecting means is positioned in said monochromatic light beam, it causes said light beam to advance along only one of said first and second optical paths.

2. The spectrophotometer of claim 1, wherein said beam splitting means comprises a stationary mirror so arranged as to reflect said monochromatic light beam received from said means for producing a beam of monochromatic light, and a chopper mirror so arranged as to cause said monochromatic light beam reflected by said first mirror to alternately advance along said first and second paths.

3. The spectrophotometer of claim 2, wherein said movable optical reflecting means comprises a movable mirror so arranged as to be able to be selectively placed at a first position out of said monochromatic light beam and a second position between said monochromatic light producing means and said stationary mirror where said monochromatic light before reflection by said stationary mirror intersects said monochromatic light beam after reflection by said chopper mirror.

4. The spectrophotometer of claim 1, further including means for directing said monochromatic light beam on said first and second optical paths to said photoelectric means.

5. The spectrophotometer of claim 4, wherein said beam directing means comprises a beam combiner.

6. A spectrophotometer comprising: a monochromator; means for providing a light beam on a first and a second optical path; cell means disposed in each of said first and second optical paths; beam combining means for causing said light beams on said first and second optical paths to alternately advance along a common optical path a monochromator disposed in said common optical path; photoelectric means for receiving the monochromatic light from said monochromator caused by said alternate light beam; and optical reflecting means movable for selective positioning in and out of said common optical path between said monochromator and said means for providing a light beam on a first and a second optical path so that when said movable optical reflecting means is positioned in said common optical path, said movable optical reflecting means causes said light beam on only one of said first and second optical paths to advance on said common optical path into said monochromator while intercepting said light beam on the other of said first and second optical paths.

7. The spectrophotometer of claim 6, wherein said light beam providing means comprises a light source and a beam splitter for causing the light from said light source to alternately advance along said first and second optical paths.

8. The spectrophotometer of claim 6, wherein said beam combining means comprises a chopper mirror so arranged as to cause said light beams on said first and second optical paths to alternately advance along said common optical path and a stationary mirror so arranged as to direct said alternate light beams on said common optical path into said monochromator.

9. A spectrophotometer comprising:
means for providing a light beam on a first and second optical path, said light beam providing means comprising a light source and a beam splitter for causing the light from said light source to alternately advance along said first and second optical path;
cell means disposed in each of said first and second optical paths;
a monochromator;
beam combining means comprising a chopper mirror so arranged as to cause said light beams on said first and second optical paths to alternately advance along a common optical path and a stationary mirror so arranged as to direct the alternate light beams on said common optical path into said monochromator;
photoelectric means for receiving the monochromatic light from said monochromator caused by said alternate light beams; and
optical reflecting means comprising a movable mirror so arranged as to be selectively positioned at a position out of said light beam on said first, second and common optical paths and a second position between said stationary mirror and said monochromator wherein said light beam on one of said first and second optical paths before reflection by said chopper mirror intersects said light beam on said common optical path after reflection by said stationary mirror.

* * * * *